(12) United States Patent
Dunko

(10) Patent No.: US 7,546,134 B2
(45) Date of Patent: Jun. 9, 2009

(54) PUSH-TO-TALK EVENT TRIGGERED LOCATION OPERATION IN A WIRELESS COMMUNICATION DEVICE

(75) Inventor: Gregory A. Dunko, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 548 days.

(21) Appl. No.: 11/396,440

(22) Filed: Apr. 3, 2006

(65) Prior Publication Data
US 2007/0232242 A1 Oct. 4, 2007

(51) Int. Cl.
H04W 4/02 (2009.01)
H04W 84/08 (2009.01)
(52) U.S. Cl. .................................... 455/519; 455/456.2
(58) Field of Classification Search ................ None
See application file for complete search history.

(56) References Cited
U.S. PATENT DOCUMENTS
2006/0046759 A1  3/2006  Yoon et al.
2006/0063548 A1  3/2006  Kim
2007/0173273 A1* 7/2007  Gogic ......................... 455/518

OTHER PUBLICATIONS
PCT International Search Report, International Application No. PCT/US2006/043913, Mailed: May 23, 2007.

* cited by examiner

Primary Examiner—Philip J Sobutka
(74) Attorney, Agent, or Firm—Coats & Bennett, P.L.L.C.

(57) ABSTRACT

The wireless communication device described herein includes a processor configured to detect a push-to-talk event and trigger a location operation responsive to the push-to-talk event. According to one exemplary embodiment, the processor determines a location of the wireless communication device and/or one or more remote wireless communication devices when the processor detects a floor control event. According to another exemplary embodiment, the processor determines a location of the wireless communication device and/or one or more remote wireless communication devices when the processor detects a session entrance event. As a result, a user may advantageously use location information about the wireless communication device and/or a remote wireless communication device to facilitate push-to-talk communications.

39 Claims, 4 Drawing Sheets

PUSH-TO-TALK EVENT TRIGGERED LOCATION OPERATION IN A WIRELESS COMMUNICATION DEVICE

BACKGROUND

This invention relates generally to wireless communication services, and more particularly to push-to-talk and location-based services in cellular telephones.

Due to the pervasiveness of cellular telephones and other wireless communication devices, manufacturers and service providers continue to explore features and/or services that will distinguish their products from their competitors' products. Currently, push-to-talk services and location-based services are particularly popular among consumers.

Push-to-talk services comprise half-duplex voice services where cellular telephones operate similarly to a walkie-talkie. Only one user speaks at a time while all other users listen. To talk, a participant presses a push-to-talk control or button and begins speaking while holding the push-to-talk button. After the participant finishes speaking, he/she releases the push-to-talk button to give other participants a chance to speak.

Location-based services provide cellular telephone users personalized services tailored to their location. These services determine the location of the user using one of several location determining technologies, such as GPS (Global Positioning System). Based on the determined location and other personalized information, the location-based service provides the user with personalized location-specific information. For example, location-based services may provide the user with a list of nearby businesses, directions to a specified location, etc.

Push-to-talk and location-based services currently operate independently on conventional cellular telephones. However, it may be beneficial if manufacturers and/or service providers develop enhanced push-to-talk and location-based services by taking advantage of complementary push-to-talk and location-based operations.

SUMMARY

An exemplary wireless communication device having push-to-talk and location-based service capabilities explicitly links the push-to-talk and location-based services. Specifically, an exemplary wireless communication device includes a processor configured to trigger a location operation responsive to a detected push-to-talk event. Exemplary push-to-talk events include floor control events, push-to-talk session events, etc., while exemplary location operations include location determining procedures, location electronics launch procedures, etc. According to one exemplary embodiment, the processor determines a location of the wireless communication device and/or one or more remote wireless communication devices when the processor detects a push-to-talk event.

DETAILED DESCRIPTION

Figure 1:
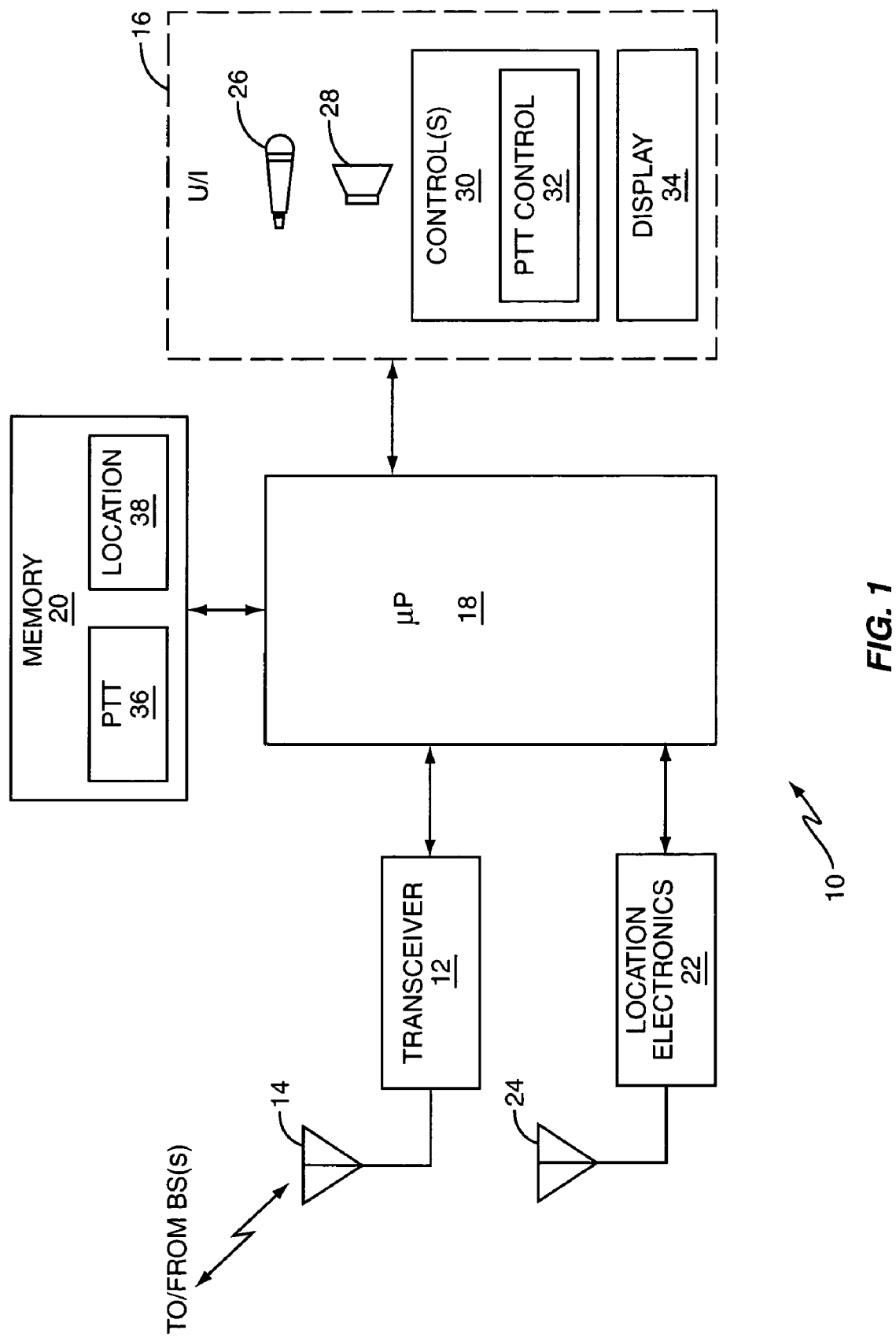
FIG. 1 illustrates a block diagram for a wireless communication device.
Figure 2:
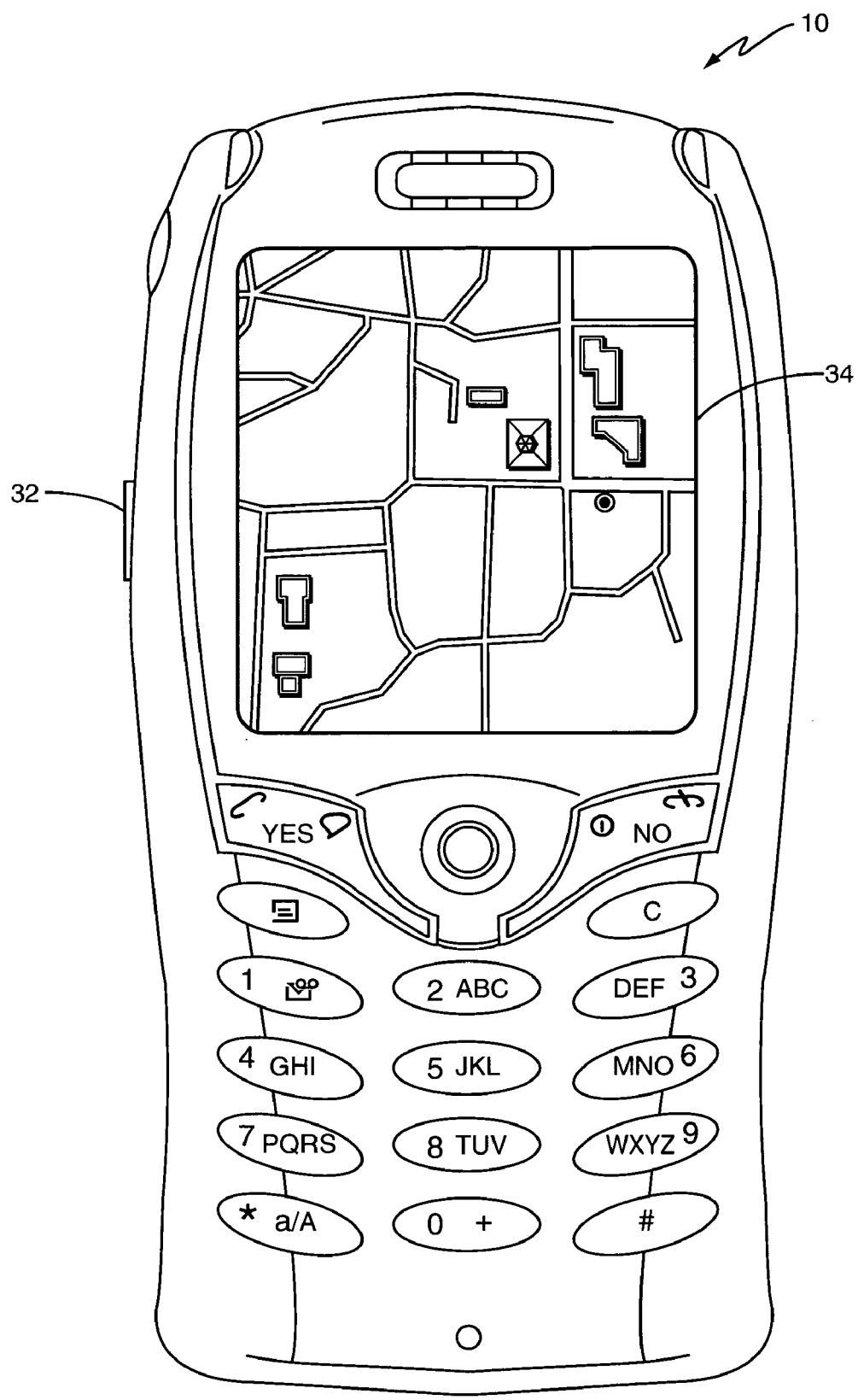
FIG. 2 illustrates one exemplary wireless communication device according to the present invention.

FIGS. 1 and 2 illustrate an exemplary wireless communication device 10 having push-to-talk and location-based service capabilities. Device 10 includes transceiver 12 with antenna 14, user interface 16, system processor 18, memory 20, and optional location electronics 22 with antenna 24. Transceiver 12 communicates with one or more remote wireless communication devices (not shown) by transmitting signals to and receiving signals from one or more base stations via antenna 14 according to any known standard, including Global System for Mobile Communications (GSM), Wideband Code Division Multiple Access (WCDMA), cdma2000 etc. It will be appreciated that the remote wireless communication devices are similar to wireless communication device 10. User interface 16 enables a user to interact with and control device 10. The user interface 16 includes microphone 26, speaker 28, and one or more input controls 30, and display 32. Microphone 26 detects audible input and converts the audible input to electrical signals for processing in processor 18. Speaker 28 receives electrical audio signals from processor 18 and converts them to audible output. Controls 30 include at least one of a keypad, joystick, soft key, etc., and enable the user to provide input to device 10. In addition, controls 30 include a push-to-talk control 32 that triggers push-to-talk services responsive to user activation. Display 34 displays information for viewing by the user.

Processor 18 performs various processing tasks, including control of the overall operation of wireless communication device 10, according to application programs stored in memory 20 and responsive to user input. According to one exemplary embodiment, memory 20 stores a push-to-talk application 36 and a location application 38 that is executed by processor 18. Push-to-talk application 36 enables the wireless communication device 10 to operate in a push-to-talk mode to provide push-to-talk services to the user.

Location application 38 enables device 10 to operate in a location mode to provide location-based services to the user. Location application 38 may use any known procedure for determining the location of device 10. For example, when device 10 includes location electronics 22, such as a GPS receiver or other location-based service receiver, location application 38 retrieves navigation coordinates, such as GPS (Global Positioning System) coordinates, GLONASS (Global Navigation System) coordinates, Galileo coordinates, triangulation coordinates, etc., from location electronics 22. In accordance with location application 38, processor 18 computes the location of device 10 based on the navigation coordinates. It will be appreciated that location application 38 may also provide device 10 with location-based services relative to one or more remote wireless communication devices.

According to one exemplary embodiment, wireless communication device 10 explicitly links the available push-to-talk and location-based services by defining one or more push-to-talk events and initiating location operations responsive to the push-to-talk events. More particularly, processor 18 monitors the operation of device 10 for one or more push-to-talk events. Responsive to detecting a push-to-talk event, processor 18 triggers a predetermined location operation. It will be appreciated that processor 18 may trigger the location operation simultaneously with executing the push-to-talk operation associated with the push-to-talk event. Alternatively, processor 18 may trigger the location operation before or after executing the push-to-talk operation associated with the push-to-talk event.

A push-to-talk event may comprise any event related to push-to-talk services. Exemplary push-to-talk events include an application launch event that launches a push-to-talk application in device 10, a floor control event that requests, grants, or releases floor control during a push-to-talk session, and a session entrance event that enters device 10 into a current push-to-talk session with other remote wireless communication devices. A push-to-talk event may also comprise trigger event that triggers a push-to-talk operation responsive to user input, such as user activation of push-to-talk control 32. Alternatively, exemplary push-to-talk events may comprise one or more of an application close event that closes a push-to-talk application and a session exit event that disconnects device 10 from a current push-to-talk session with other remote wireless communication devices.

Push-to-talk events may be software-generated, user-generated, and/or network-generated. For example, software executed by processor 18 may generate a push-to-talk event while executing push-to-talk application 36. In other embodiments, a push-to-talk event may be generated responsive to user input, such as user activation of push-to-talk control 32, user selection of a push-to-talk event from a menu displayed on display 34, etc. Push-to-talk events may also be generated by the network during push-to-talk sessions between one or more wireless communication devices. For example, the network may generate a push-to-talk event when granting floor control to a wireless communication device during a push-to-talk session.

A location operation may comprise any type of operation or procedure associated with location-based services and/or the operation of location electronics 22. Exemplary location operations include state determining procedures, capability determining procedures, activation operations, launch operations, and location determining procedures. State determining procedures determine an operational state, such as on/off, current operational status, etc., of location electronics 22. Capability determining procedures determine a capability, such as GPS, triangulation, etc., of the location electronics 22. Activation operations activate or turn on the location electronics 22, while launch operations launch a location application 38 in device 10. Alternatively, exemplary location operations may include application terminating procedures, deactivating procedures, and location terminating procedures. Application terminating procedures terminate a push-to-talk application device 10. Deactivating procedures deactivate location electronics 22, while location terminating procedures terminate location determination requests or processes in device 10. It will be appreciated that the above-described location operations may additionally or alternatively apply to any remote wireless communication devices in a push-to-talk group with device 10.

Figure 3:
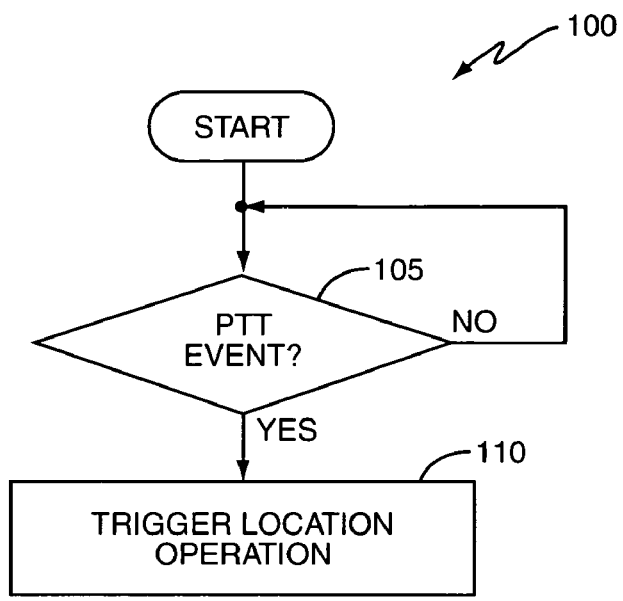
FIG. 3 illustrates a flow chart for an exemplary process associated with the wireless communication device.

FIG. 3 illustrates an exemplary process 100 as executed by processor 18 that links the push-to-talk and location-based services of device 10. When processor 18 detects a push-to-talk event (block 105), processor 18 triggers a location operation (block 110). For example, the location operation may determine the location of device 10 or the location of a remote party responsive to a push-to-talk event, such as a floor control event.

Device 10 may provide results from the location operation to the user, the wireless network, and/or a remote wireless communication device. In one exemplary embodiment, processor 18 provides the location of a remote wireless communication device to an output of device 10, such as a speaker 28, display 34, etc. For example, processor 18 may generate a map for display on display 34 that visually illustrates the location of the device 10 and/or a remote wireless communication device, as shown in FIG. 2. Alternatively, speaker 28 may project an address, display 34 may display an address, etc. In another exemplary embodiment, device 10 sends its location to one or more remote wireless communication devices using a SIP message. In still another exemplary embodiment, device 10 sends a message to the wireless network indicating the location of device 10. It will be appreciated that these examples are for illustrative purposes, and therefore are non-limiting.

Figure 4:
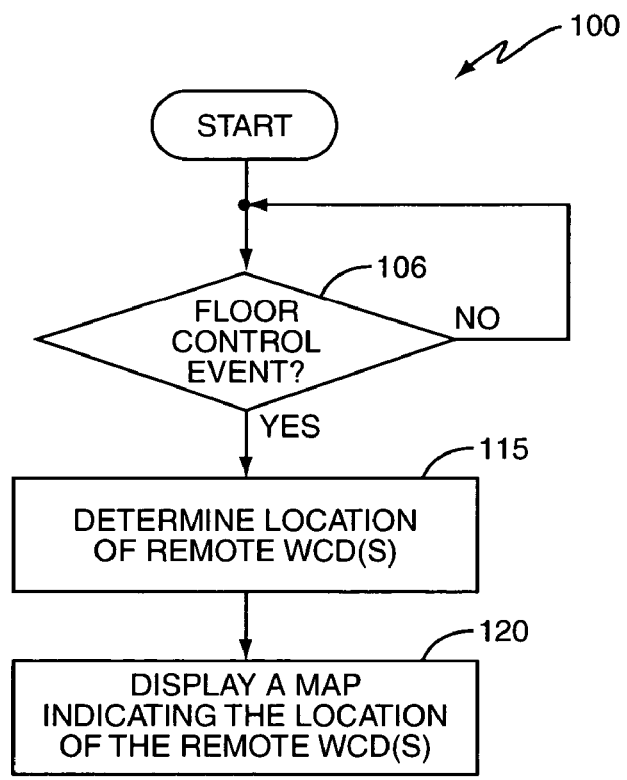
FIG. 4 illustrates a flow chart for another exemplary process associated with the wireless communication device.

In one non-limiting example, assume wireless communication device 10 operated by a taxi dispatcher is in communication with a plurality of remote wireless communication devices (WCD) operated by taxi drivers. FIG. 4 illustrates an exemplary flow chart for this embodiment. When the dispatcher presses push-to-talk control 32, processor 18 detects a floor control event (block 106). Responsive to the floor control event, processor 18 determines the location of the remote devices according to any known means (block 115). Processor 18 displays the location of each of the remote devices in a map on display 34 (block 120). This enables the taxi dispatcher to quickly view the location of each taxi and determine assignments for each taxi driver.

Figure 5:
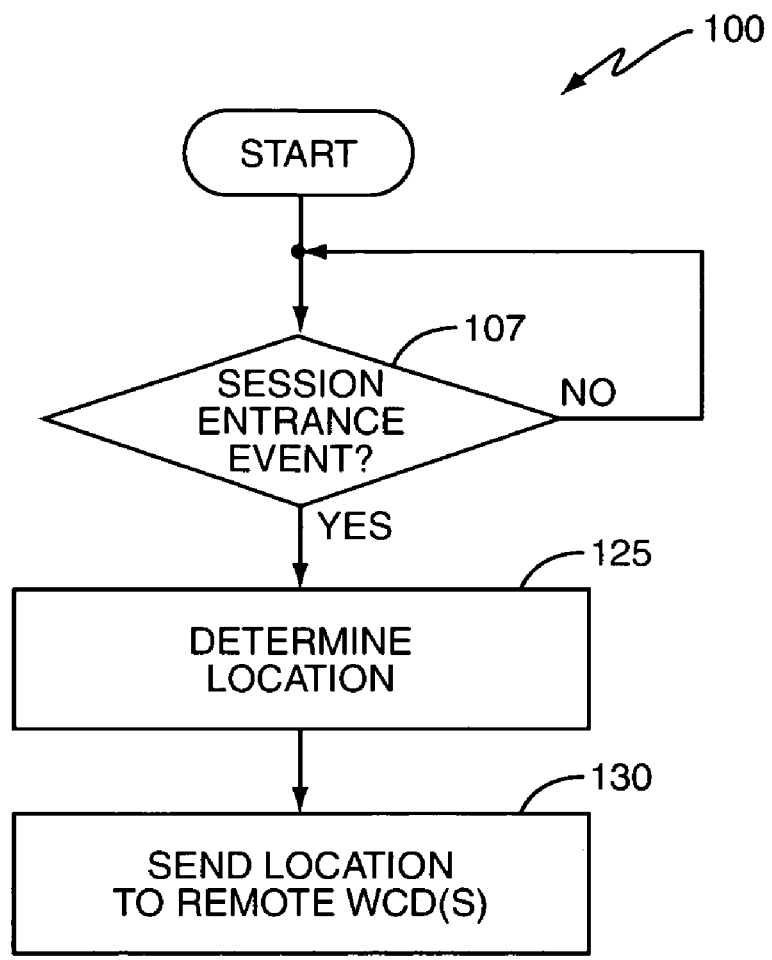
FIG. 5 illustrates a flow chart for another exemplary process associated with the wireless communication device.

In another non-limiting example, assume wireless communication device 10 is operated by a taxi driver in communication with a remote wireless communication device operated by a taxi dispatcher. In this embodiment, as illustrated in FIG. 5, when the taxi driver enters a push-to-talk session with the taxi dispatcher (block 107), processor 18 determines the location of the taxi driver's device 10 (block 125). Subsequently, device 10 sends the location to the dispatcher's wireless communication device according to any known means. For example, wireless communication device 10 may use a SIP message to send the location to the dispatcher's device. In any event, providing the taxi's location to the dispatcher enables the dispatcher to intelligently and efficiently control the workflow of the taxi driver.

The above examples are illustrative only, and do not limit the invention described herein. Indeed, the above described wireless communication device 10 and process may be used by a wide variety of groups, including families, friends, businesses, etc. For example, parents may use the above-described invention to determine the location of a child while engaging in a push-to-talk session with the child.

While the above generally describes the invention in terms of a floor control event, session entrance event, and location determining procedures, any push-to-talk events may trigger any location operation. However, it will be appreciated that certain location operations more logically apply to certain push-to-talk events. For example, processor 18 may trigger a launch operation responsive to detecting a push-to-talk launch event. Alternatively, processor 18 my trigger a location determination operation responsive to detecting a session entrance event. In still another example, processor 18 may trigger a deactivation operation responsive to detecting a session exit event.

While the present invention describes triggering a single location operation responsive to a push-to-talk event, the present invention is not so limited. In one exemplary embodiment, processor 18 may periodically trigger location operations in response to a single push-to-talk event. For example, after detecting a session entrance event, processor 18 may trigger a location determination operation every 2 minutes.

The exemplary wireless communication device 10 and process described above links push-to-talk and location-based services. As a result, the user may trigger a single push-to-talk event to take advantage of both push-to-talk and location operations. Specifically, the user may advantageously determine location information for a member of their push-to-talk group and/or provide their location information to other members of their push-to-talk group without having to separately access the location application.

The above-described wireless communication device 10 may comprise any type of wireless communication device capable of transmitting and receiving signals in a wireless network. Exemplary wireless communication devices include cellular telephones, personal data assistants, laptop and palmtop computers, etc.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented in a wireless communication device having push-to-talk capabilities, said method comprising:
    detecting a push-to-talk event; and
    triggering a location operation responsive to the push-to-talk event, wherein the location operation comprises at least one of:
        a state determining procedure for determining an operational state of location electronics in at least one of the wireless communication device and one or more remote wireless communication devices;
        a capability determining procedure for determining a capability of the location electronics in at least one of the wireless communication device and the one or more remote wireless communication devices;
        an application terminating procedure for terminating a location application in at least one of the wireless communication device and the one or more remote wireless communication devices;
        a deactivating procedure for deactivating the location electronics in at least one of the wireless communication device and the one or more remote wireless communication devices; and
        a location terminating procedure for terminating a location request in at least one of the wireless communication device and the one or more remote wireless communication devices.

2. The method of claim 1 wherein the push-to-talk event comprises a floor control event.

3. The method of claim 2 wherein the location operation triggered by the floor control event further comprises a location determining procedure.

4. The method of claim 3 wherein the location determining procedure determines a location of the wireless communication device.

5. The method of claim 3 wherein the location determining procedure determines a location of one more remote wireless communication devices.

6. The method of claim 1 wherein the push-to-talk event comprises a session entrance event.

7. The method of claim 6 wherein the location operation triggered by the session entrance event further comprises a location determining procedure.

8. The method of claim 7 wherein the location determining procedure determines a location of the wireless communication device.

9. The method of claim 7 wherein the location determining procedure determines a location of one more remote wireless communication devices.

10. The method of claim 1 wherein the push-to-talk event comprises one of an application launch event, a floor control event, a trigger event, and a session entrance event.

11. The method of claim 10 wherein the location operation further comprises an activation operation for activating the location electronics in at least one of the wireless communication device and the one or more remote wireless communication devices.

12. The method of claim 10 wherein the location operation further comprises a launch operation for launching a location application in at least one of the wireless communication device and the one or more remote wireless communication devices.

13. The method of claim 10 wherein the location operation further comprises a location determining procedure for determining a location of at least one of the wireless communication device and the one or more remote wireless communication devices.

14. The method of claim 1 wherein the push-to-talk event comprises at least one of an application close event and a session exit event.

15. The method of claim 1 further comprising providing results from the location operation to at least one of a wireless network, the wireless communication device, and one or more remote wireless communication devices.

16. The method of claim 1 further comprising outputting results from the location operation to an output device of the wireless communication device.

17. The method of claim 16 wherein outputting the results from the location operation comprises outputting location results to a display of the wireless communication device.

18. The method of claim 1 further comprising periodically triggering additional location operations after triggering the first location operation.

19. The method of claim 1 wherein the push-to-talk event comprises at least one of a software-generated push-to-talk event, a user input generated push-to-talk event, and a network-generated push-to-talk event.

20. A wireless communication device having push-to-talk capabilities, the wireless communication device comprising:
    a processor configured to:
        detect a push-to-talk event; and
        trigger a location operation responsive to the push-to-talk event, wherein the location operation comprises at least one of:
            a state determining procedure for determining an operational state for location electronics in at least one of the wireless communication device and one or more remote wireless communication devices;
            a capability determining procedure for determining a capability of the location electronics in at least one of the wireless communication device and the one or more remote wireless communication devices;
            an application terminating procedure for terminating a location application in at least one of the wireless communication device and the one or more remote wireless communication devices;
            a deactivating procedure for deactivating the location electronics in at least one of the wireless communication device and the one or more remote wireless communication devices; and a location terminating procedure for terminating a location request in at least one of the wireless communication device and the one or more remote wireless communication devices.

21. The wireless communication device of claim 20 further comprising a push-to-talk control, wherein user activation of the push-to-talk control generates the push-to-talk event.

22. The wireless communication device of claim 21 wherein the push-to-talk event comprises a floor control event activated by user activation of the push-to-talk control.

23. The wireless communication device of claim 22 wherein the location operation triggered by the floor control event further comprises a location determining procedure.

24. The wireless communication device of claim 23 wherein the location determining procedure determines a location of the wireless communication device.

25. The wireless communication device of claim 23 wherein the location determining procedure determines a location of one or more remote wireless communication devices.

26. The wireless communication device of claim 20 wherein the push-to-talk event comprises a session entrance event.

27. The wireless communication device of claim 26 wherein the location operation triggered by the session entrance event further comprises a location determining procedure.

28. The wireless communication device of claim 27 wherein the location determining procedure determines a location of the wireless communication device.

29. The wireless communication device of claim 27 wherein the location determining procedure determines a location of one or more remote wireless communication devices.

30. The wireless communication device of claim 20 wherein the push-to-talk event comprises one of an application launch event, a floor control event, a trigger event, and a session entrance event.

31. The wireless communication device of claim 30 wherein the location operation further comprises an activation operation for activating the location electronics in at least one of the wireless communication device and the one or more remote wireless communication devices.

32. The wireless communication device of claim 30 wherein the location operation further comprises a launch operation for launching a location application in at least one of the wireless communication device and the one or more remote wireless communication devices.

33. The wireless communication device of claim 30 wherein the location operation further comprises a location determining procedure for determining a location of at least one of the wireless communication device and the one or more remote wireless communication devices.

34. The wireless communication device of claim 20 wherein the push-to-talk event comprises at least one of an application close event and a session exit event.

35. The wireless communication device of claim 20 wherein the processor is further configured to provide results from the location operation to at least one of a wireless network and one or more remote wireless communication devices.

36. The wireless communication device of claim 20 wherein the processor is further configured to provide results from the location operation to an output device of the wireless communication device.

37. The wireless communication device of claim 36 further comprising a display, wherein the results comprise location results, and wherein the processor is configured to provide the location results to the display.

38. The wireless communication device of claim 20 wherein the processor is further configured to periodically trigger additional location operations after triggering the first location operation.

39. The wireless communication device of claim 20 wherein the push-to-talk event comprises at least one of a software-generated push-to-talk event, a user input generated push-to-talk event, and a network-generated push-to-talk event.

* * * * *